United States Patent
Krishnamurthy et al.

(10) Patent No.: US 10,747,207 B2
(45) Date of Patent: Aug. 18, 2020

(54) SYSTEM AND METHOD FOR ACCURATE AUTOMATIC DETERMINATION OF "ALARM-OPERATOR ACTION" LINKAGE FOR OPERATOR ASSESSMENT AND ALARM GUIDANCE USING CUSTOM GRAPHICS AND CONTROL CHARTS

(71) Applicant: Honeywell International Inc., Morris Plains, NJ (US)

(72) Inventors: Ananthapadmanabha Krishnamurthy, Bangalore (IN); Ramakrishnan Ganapathi, Bangalore (IN); Viraj Srivastava, New Delhi (IN); Anand Narayan, Bangalore (IN); Prangya Priyadarsini, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 64 days.

(21) Appl. No.: 16/009,873

(22) Filed: Jun. 15, 2018

(65) Prior Publication Data
US 2019/0384267 A1    Dec. 19, 2019

(51) Int. Cl.
*G05B 19/418*    (2006.01)

(52) U.S. Cl.
CPC ............ *G05B 19/4184* (2013.01); *G05B 2219/31368* (2013.01); *G05B 2219/31439* (2013.01); *G05B 2219/35409* (2013.01)

(58) Field of Classification Search
CPC ...... G05B 19/4184; G05B 2219/31368; G05B 2219/31439; G05B 2219/35409
See application file for complete search history.

(56) References Cited

U.S. PATENT DOCUMENTS

| 5,255,354 A | 10/1993 | Mahoney |
| 5,287,390 A | 2/1994 | Scarola et al. |

(Continued)

FOREIGN PATENT DOCUMENTS

| CN | 105512425 A | 4/2016 |
| EP | 0156343 A2 | 10/1985 |

(Continued)

OTHER PUBLICATIONS

Litt, "Steve Litt's PERLs of Wisdom: PERL Regular Expressions (With Snippets)", 2003, 8 pages.

(Continued)

*Primary Examiner* — Thomas C Lee
*Assistant Examiner* — Michael Tang (57) ABSTRACT

An apparatus, method, and non-transitory machine-readable medium provide for accurate automatic determination of alarm-operator action linkage for operator assessment and alarm guidance using custom graphics and control charts. The apparatus includes a memory and a processor operably connected to the memory. The processor receives process control system data regarding a field device in an industrial process control and automation system; extracts information from the process control system data; generates a tuple based on the extracted information; and performs a rectifying operation in the industrial process control and automation system based on the generated tuple of the field device.

19 Claims, 5 Drawing Sheets

(56) References Cited

U.S. PATENT DOCUMENTS

| | | | |
|---|---|---|---|
| 5,347,449 A * | 9/1994 | Meyer | D01H 13/14 |
| | | | 57/264 |
| 5,353,315 A | 10/1994 | Scarola et al. | |
| 5,404,411 A | 4/1995 | Banton et al. | |
| 5,568,568 A | 10/1996 | Takizawa et al. | |
| 5,581,242 A | 12/1996 | Arita et al. | |
| 5,617,311 A | 4/1997 | Easter et al. | |
| 5,768,119 A | 6/1998 | Havekost et al. | |
| 5,821,440 A | 10/1998 | Khater et al. | |
| 6,088,483 A | 7/2000 | Nakano et al. | |
| 6,134,690 A * | 10/2000 | Ivaturi | G06F 11/2294 |
| | | | 714/46 |
| 6,308,141 B1 | 10/2001 | Saito et al. | |
| 6,356,282 B2 | 3/2002 | Roytman et al. | |
| 6,437,812 B1 | 8/2002 | Giles et al. | |
| 6,462,652 B1 | 10/2002 | McCuen et al. | |
| 6,535,122 B1 | 3/2003 | Bristol | |
| 6,690,274 B1 | 2/2004 | Bristol | |
| 6,774,786 B1 | 8/2004 | Havekost et al. | |
| 6,845,336 B2 | 1/2005 | Kodukula et al. | |
| 7,000,193 B1 | 2/2006 | Impink, Jr. et al. | |
| 7,151,854 B2 | 12/2006 | Shen et al. | |
| 7,250,856 B2 | 7/2007 | Havekost et al. | |
| 7,352,279 B2 | 4/2008 | Yu et al. | |
| 7,388,482 B2 | 6/2008 | Dousson et al. | |
| 7,428,300 B1 | 9/2008 | Drew et al. | |
| 7,496,591 B2 | 2/2009 | Mets et al. | |
| 7,502,519 B2 | 3/2009 | Eichhorn et al. | |
| 7,593,780 B2 | 9/2009 | Mann et al. | |
| 7,653,238 B2 | 1/2010 | Stentiford | |
| 7,679,504 B2 | 3/2010 | Wang et al. | |
| 7,920,935 B2 | 4/2011 | Knipfer et al. | |
| 7,945,817 B1 | 5/2011 | Usery et al. | |
| 7,961,087 B2 | 6/2011 | Hoveida | |
| 8,229,579 B2 | 7/2012 | Eldridge et al. | |
| 8,447,076 B2 | 5/2013 | Yamamoto et al. | |
| 8,516,323 B2 | 8/2013 | Bryant et al. | |
| 8,629,877 B2 | 1/2014 | Bakalash et al. | |
| 9,256,472 B2 | 2/2016 | Kakade et al. | |
| 9,342,859 B2 | 5/2016 | Ayanam et al. | |
| 9,547,291 B2 | 1/2017 | Tran et al. | |
| 9,551,986 B2 | 1/2017 | Lo | |
| 2001/0019328 A1 | 9/2001 | Schwuttke et al. | |
| 2002/0012011 A1 | 1/2002 | Roytman et al. | |
| 2002/0022894 A1 | 2/2002 | Eryurek et al. | |
| 2002/0055790 A1 | 5/2002 | Havekost | |
| 2002/0085020 A1 | 7/2002 | Carroll | |
| 2002/0099786 A1 | 7/2002 | Chun | |
| 2002/0101431 A1 * | 8/2002 | Forney | G06F 21/105 |
| | | | 345/582 |
| 2002/0154009 A1 | 10/2002 | McCuen et al. | |
| 2002/0174083 A1 | 11/2002 | Hellerstein et al. | |
| 2002/0186261 A1 | 12/2002 | Giles et al. | |
| 2004/0176926 A1 | 9/2004 | Edie et al. | |
| 2005/0012608 A1 | 1/2005 | Havekost et al. | |
| 2005/0062598 A1 | 3/2005 | Akamatsu et al. | |
| 2005/0197806 A1 | 9/2005 | Eryurek et al. | |
| 2005/0235356 A1 | 10/2005 | Wang | |
| 2005/0248781 A1 | 11/2005 | Tin | |
| 2006/0106797 A1 | 5/2006 | Srinivasa et al. | |
| 2006/0168013 A1 * | 7/2006 | Wilson | G05B 19/4184 |
| | | | 709/206 |
| 2007/0008099 A1 | 1/2007 | Kimmel et al. | |
| 2007/0033632 A1 | 2/2007 | Baynger et al. | |
| 2007/0142934 A1 | 6/2007 | Boercsoek et al. | |
| 2007/0194920 A1 | 8/2007 | Hollifield | |
| 2007/0211079 A1 | 9/2007 | Nixon et al. | |
| 2007/0268122 A1 | 11/2007 | Kow et al. | |
| 2008/0104003 A1 * | 5/2008 | Macharia | C12M 41/48 |
| | | | 706/45 |
| 2008/0165151 A1 | 7/2008 | Lemay et al. | |
| 2008/0189637 A1 | 8/2008 | Krajewski et al. | |
| 2008/0189638 A1 | 8/2008 | Mody et al. | |
| 2008/0300698 A1 | 12/2008 | Havekost et al. | |
| 2009/0006903 A1 | 1/2009 | Devitt et al. | |
| 2009/0109860 A1 | 4/2009 | Cinato et al. | |
| 2009/0153528 A1 | 6/2009 | Orr | |
| 2009/0299827 A1 | 12/2009 | Puri et al. | |
| 2010/0156654 A1 | 6/2010 | Bullemer et al. | |
| 2010/0289638 A1 | 11/2010 | Borchers et al. | |
| 2011/0166912 A1 | 7/2011 | Susumago | |
| 2012/0188592 A1 | 7/2012 | Handley et al. | |
| 2013/0002697 A1 | 1/2013 | Ashley et al. | |
| 2014/0277612 A1 | 9/2014 | Justin et al. | |
| 2014/0335480 A1 | 11/2014 | Asenjo et al. | |
| 2014/0349255 A1 | 11/2014 | Watt et al. | |
| 2014/0364969 A1 * | 12/2014 | Timsjo | G05B 23/0272 |
| | | | 700/83 |
| 2015/0105876 A1 | 4/2015 | Tran et al. | |
| 2015/0105893 A1 | 4/2015 | Tran et al. | |
| 2015/0149134 A1 | 5/2015 | Mehta et al. | |
| 2015/0220080 A1 * | 8/2015 | Nixon | G05B 19/418 |
| | | | 700/19 |
| 2015/0254957 A1 | 9/2015 | Wilson et al. | |
| 2015/0277404 A1 | 10/2015 | Maturana et al. | |
| 2015/0338836 A1 * | 11/2015 | Law | G05B 19/0426 |
| | | | 700/87 |
| 2016/0155309 A1 | 6/2016 | Watson et al. | |
| 2016/0300027 A1 | 10/2016 | Jensen et al. | |
| 2018/0157641 A1 * | 6/2018 | Byron | G06F 17/2785 |
| 2018/0322770 A1 | 11/2018 | Srinivasan et al. | |

FOREIGN PATENT DOCUMENTS

| | | |
|---|---|---|
| EP | 0717866 B1 | 11/1997 |
| EP | 0959398 A1 | 11/1999 |
| EP | 0906629 B1 | 2/2003 |
| GB | 2275564 A | 8/1994 |
| GB | 2372365 A | 8/2002 |
| GB | 2395831 A | 6/2004 |
| GB | 2412449 A | 9/2005 |
| GB | 2419723 A | 5/2006 |
| GB | 2426355 A | 11/2006 |
| JP | 6242169 A | 9/1994 |
| JP | 2004192543 A | 7/2004 |
| KR | 10-2010-0043507 A | 4/2010 |
| WO | 3001343 A2 | 1/2003 |
| WO | 3023711 A2 | 3/2003 |
| WO | 2005067403 A2 | 7/2005 |
| WO | 2005109126 A1 | 11/2005 |
| WO | 2006000110 A1 | 1/2006 |
| WO | 2006058090 A2 | 6/2006 |
| WO | 2013003165 A2 | 1/2013 |

OTHER PUBLICATIONS

Klemettinen et al., "Interactive exploration of interesting findings in the Telecommunication Network Alarm Sequence Analyzer TASA", Information and Software Technology 41, 1999, 11 pages.

Klemettinen et al., "Rule Discovery in Telecommunication Alarm Data", Journal of Network and Systems Management, vol. 7, No. 4, 1999, 29 pages.

De Amo et al., "First-Order Temporal Pattern Mining with Regular Expression Constraints", Data & Knowledge Engineering, vol. 62, 2007, 15 pages.

Zheng et al., "Intelligent Search of Correlated Alarms for GSM Networks with Model-based Constraints", 2002, 8 pages.

Stanton et al., "Alarm-initiated activities: an analysis of alarm handling by operators using text-based alarm systems in supervisory control systems", Ergonomics, vol. 38, No. 11, 1995, 18 pages.

Kvalem et al., "The Simulator-Based Halden Man-Machine Laboratory (HAMMLAB) and its Application in Human Factor Studies", OECD Halden Reactor Project, Institute for Energy Technology, Norway, 2000, 7 pages.

"Experion Operator's Guide", EP-DSXX44, Release 300, Honeywell International Inc., Jun. 2006, 183 pages.

Gordon et al., "Alarm Presentation System", Westinghouse Electric Company LLC, 2007, 23 pages.

Errington et al., "ASM Consortium Guidelines, Effective Alarm Management Practices", Version 5.02, May 2007, 130 pages.

(56) References Cited

OTHER PUBLICATIONS

Bullemer et al., "ASM Consortium Technical Report, Addressing Alarm Flood Situations: Stage 2 Experimental Design", Version 1.02, Jan. 2008, 51 pages.
Bullemer et al., "ASM Consortium Technical Report, Addressing Alarm Flood Situations: Operator Interface Design Considerations", Version 1.00, May 2007, 31 pages.
Bullemer et al., "ASM Consortium Guidelines, Effective Operations Practices", Version 5.00, May 2008, 128 pages.
Brown et al., "Advanced Alarm Systems: Revision of Guidance and Its Technical Basis", Brookhaven National Laboratory, Nov. 2000, 132 pages.
Bristol, "Improved process control alarm operation", ISA Transactions 40, 2001, 15 pages.
Tuszynski et al., "A Pilot Project on Alarm Reduction and Presentation Based on Multilevel Flow Models", Proceedings of the Enlarged Halden Programme Group Meeting, 2002, 12 pages.
"ASM Consortium QRM, Alarm Trend Development Update", Honeywell International Inc., Jun. 2010, 20 pages.
Mannila et al., "Discovery of Frequent Episodes in Event Sequences", Data Mining and Knowledge Discovery 1, 1997, 31 pages.
Haigh et al., "Machine Learning for Alarm System Performance Analysis", ASM Consortium, 2000, 4 pages.
Hollifield et al., "The Alarm Management Handbook, A Comprehensive Guide", 2006, 11 pages.
Colombe et al., "Statistical Profiling and Visualization for Detection of Malicious Insider Attacks on Computer Networks", Proceedings of the 2004 ACM Workshop on Visualization and Data Mining for Computer Security, Oct. 2004, 5 pages.
Frost et al., "Analyzing Alarm and Trend Data", Schneider Electric, Jun. 2008, 11 pages.
Winer, "Vienna Sampler Software: The AWE 64's Well-Kept Secret", Aug. 2015, 8 pages.
Extended European Search Report for European Patent Application No. 12804871.7 dated May 22, 2015, 7 pages.
Office Action for U.S. Appl. No. 13/170,833 dated Sep. 16, 2014, 28 pages.
Office Action for U.S. Appl. No. 13/170,833 dated Sep. 17, 2015, 30 pages.
International Search Report and Written Opinion of the International Searching Authority for PCT Patent Application No. PCT/US2012/043425 dated Dec. 27, 2012, 9 pages.
Office Action for U.S. Appl. No. 12/634,425 dated Jul. 30, 2015, 27 pages.
Arjomandi et al., "Development of an efficient alarm management package for an industrial process plant", 2011 Chinese Control and Decision Conference (CCDC), Aug. 2011, 6 pages.
EEMUA, "Alarm Systems: A Guide to Design, Management and Procurement", The Engineering and Materials Users' Association, 2007, 191 pages.
"Management of Alarm Systems for the Process of Industries", Instrumentation, Systems, and Automation Society, ANSI/ISA—18.2—2009, Jun. 2009, 82 pages.
"DynAMo Alarm Suite R100—Advanced Solutions", Honeywell Process Solutions, Nov. 2013, 2 pages.
"DynAMo Metrics & Reporting R120.1 Software Change Notice", Honeywell Process Solutions, Oct. 2015, 16 pages.
Niemiec et al., U.S. Appl. No. 16/049,372 entitled "Process Performance Issues and Alarm Notification Using Data Analytics" filed Jul. 30, 2018, 35 pages.
Ganapathi et al., U.S. Appl. No. 15/987,542 entitled "Competency Gap Identification of an Operators Response to Various Process Control and Maintenance Conditions" filed May 23, 2018, 53 pages.
Ganapathi et al., U.S. Appl. No. 15/953,072 entitled "System and Method for Translation of Graphics to Newer Format Using Pattern Matching" filed Apr. 13, 2018, 33 pages.

* cited by examiner

| DATA | 1. EVENTS DATA | 2. CONFIGURATION DATA | 3. GRAPHICS DATA | 4. PROCESS HISTORIAN DATA |
|---|---|---|---|---|
| | 1. PROCESS ALARMS<br>2. ALARM PRIORITY<br>3. PROCESS CHANGES<br>4. PROCESS MESSAGE<br>5. SYSTEM ALARMS<br>6. TIME STAMP | PROCESS TAG<br>1. INPUT CONNECTION<br>2. OUTPUT CONNECTION<br>3. ALGORITHM TYPE<br>4. DESCRIPTION<br>5. ASSET (GROUPING)<br>6. PARAMETER NAME, DATA TYPE<br>7. PARAMETER VALUE<br>8. DYNAMIC ALARM SUPPRESSION | PROCESS TAG<br>1. SECONDARY PROCESS TAG<br>2. UPSTREAM/DOWNSTREAM<br>3. PROCESS CONNECTION/ CONTROL CONNECTION<br>4. DEVICE TYPE<br>5. GRAPHIC OBJECT TYPE | 1. CONFIGURATION OF SAMPLING INTERVAL<br>2. HISTORY PV/OP DATA<br><br>425 |
| INFORMATION EXTRACTED FROM DATA ABOVE<br><br>415 | 1. DETERMINING OPERATORS AVAILABILITY TO RESPOND (OPERATIONAL CONSTRAINTS, BASED ON ALARM PRIORITY)<br>2. ALARM GROUPING<br>3. ALARM-OPERATOR ACTION LINKAGE | 1. CONTROL RELATIONSHIPS<br>2. OPERATING LIMITS FOR MODEL PARAMETERS, e.g., ALARMS AND OP LIMITS<br>3. ASSET GROUPING<br>4. PARAMETER TYPES - NUMERIC, ENUMERATION, BOOLEAN<br>5. ALARM GROUPING PROCESS CONNECTION BASED ON "DYNAMIC ALARM SUPPRESSION" | 1. INTERDEPENDENT, INDEPENDENT AND DEPENDENT SEQUENCES OF VARIABLES FOR EACH MODEL (REPRESENTING A SUBSYSTEM)<br><br>445 | 1. CRITICAL LOOPS<br>2. DEVIATION FROM OPERATING LIMITS<br>3. COST IMPACT DUE TO DEVIATION FROM OPERATING LOOPS<br><br>430 |
| USES OF THE INFORMATION EXTRACTED | ENABLES CONTEXT AND EVENT IDENTIFICATION (FIRST LEVEL MODEL)<br><br>PROVIDES FIRST LEVEL "ALARM OPERATOR RESPONSE" LINKAGE | IMPROVES ACCURACY OF THE ANALYTICS MODEL<br><br>ENABLES IDENTIFICATION OF THE PROCESS CONTEXT | 1. IMPROVES COMPUTATIONAL EFFICIENCY<br>2. PROVIDES PROCESS RELATIONSHIP<br>3. IMPROVES ACCURACY OF CONTEXT RELATIONSHIP<br>4. IMPROVES THE PROCESS CONTEXT ACCURACY AND ENABLES "PROCESS-CONTEXT-ALARM-OPERATOR ACTION" LINKAGE | PROVIDES MANIPULATED VARIABLE TO PROCESS VARIABLE RELATIONSHIP<br><br>460 |

FIG. 5

SYSTEM AND METHOD FOR ACCURATE AUTOMATIC DETERMINATION OF "ALARM-OPERATOR ACTION" LINKAGE FOR OPERATOR ASSESSMENT AND ALARM GUIDANCE USING CUSTOM GRAPHICS AND CONTROL CHARTS

TECHNICAL FIELD

This disclosure relates generally to autonomous operating industrial plants. More specifically, this disclosure relates to systems and methods for accurate automatic determination of "alarm-operator action" linkage for operator assessment and alarm guidance using custom graphics and control charts.

BACKGROUND

Effective process alarm analysis and identification of corrective action sequences is important for efficient manual and autonomous operation of an industrial plant. Alarms often re-occur on the same device tag or, at times, groups of devices go into alarm state together. The operator actions to resolve the process alarms can be assessed from the system data to identify the competency gaps and guide the operators to resolve alarms faster and better.

SUMMARY

This disclosure provides systems and methods for accurate automatic determination of "alarm-operator action" linkage for operator assessment and alarm guidance using custom graphics and control charts.

In a first embodiment, an apparatus provides for accurate automatic determination of alarm-operator action linkage for operator assessment and alarm guidance using custom graphics and control charts. The apparatus includes a memory and a processor operably connected to the memory. The processor receives process control system data regarding a field device in an industrial process control and automation system; extracts information from the process control system data; generates a tuple based on the extracted information; and performs a rectifying operation in the industrial process control and automation system based on the generated tuple of the field device.

In a second embodiment, a method provides for accurate automatic determination of alarm-operator action linkage for operator assessment and alarm guidance using custom graphics and control charts. The method includes receiving process control system data regarding a field device in an industrial process control and automation system; extracting information from the process control system data; generating a tuple based on the extracted information; and performing a rectifying operation in the industrial process control and automation system based on the generated tuple of the field device.

In a third embodiment, a non-transitory medium provides for accurate automatic determination of alarm-operator action linkage for operator assessment and alarm guidance using custom graphics and control charts. The instructions cause one or more processors to receive process control system data regarding a field device in an industrial process control and automation system; extract information from the process control system data; generate a tuple based on the extracted information; and perform a rectifying operation in the industrial process control and automation system based on the generated tuple of the field device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 4 illustrates example data sources according to this disclosure; and

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Figure 1:
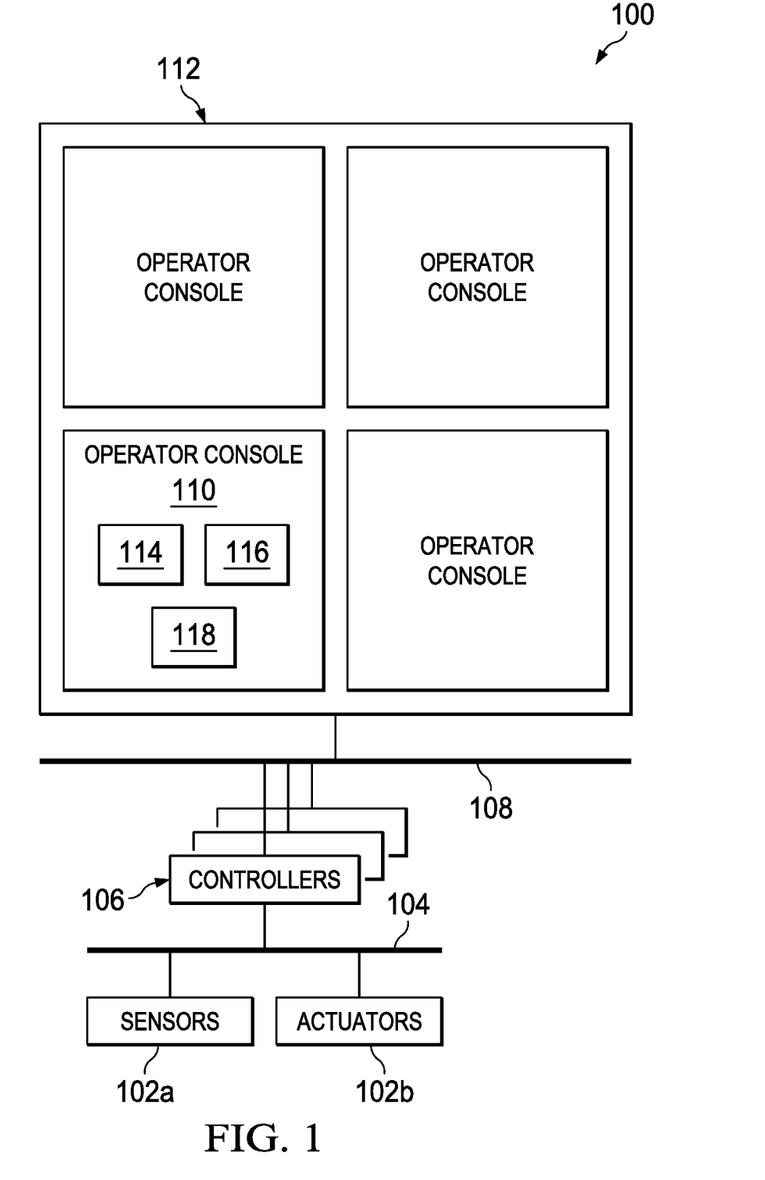
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as pressure, temperature, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control or other advanced predictive control. As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

Each operator console 110 includes any suitable structure for displaying information to and interacting with an operator. For example, each operator console 110 could include one or more processing devices 114, such as one or more processors, microprocessors, microcontrollers, field programmable gate arrays, application specific integrated circuits, discrete logic devices, or other processing or control devices. Each operator console 110 could also include one or more memories 116 storing instructions and data used, generated, or collected by the processing device(s) 114. Each operator console 110 could further include one or more network interfaces 118 that facilitate communication over at least one wired or wireless network, such as one or more Ethernet interfaces or wireless transceivers.

In accordance with this disclosure, a technique is provided for accurate automatic determination of "alarm-operator action" linkage for operator assessment and alarm guidance using custom graphics and control charts. One or more components of the system 100 (e.g., an operator console 112) could be configured to perform one or more operations associated with this technique.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which a pressure sensor could be used.

Figure 2:
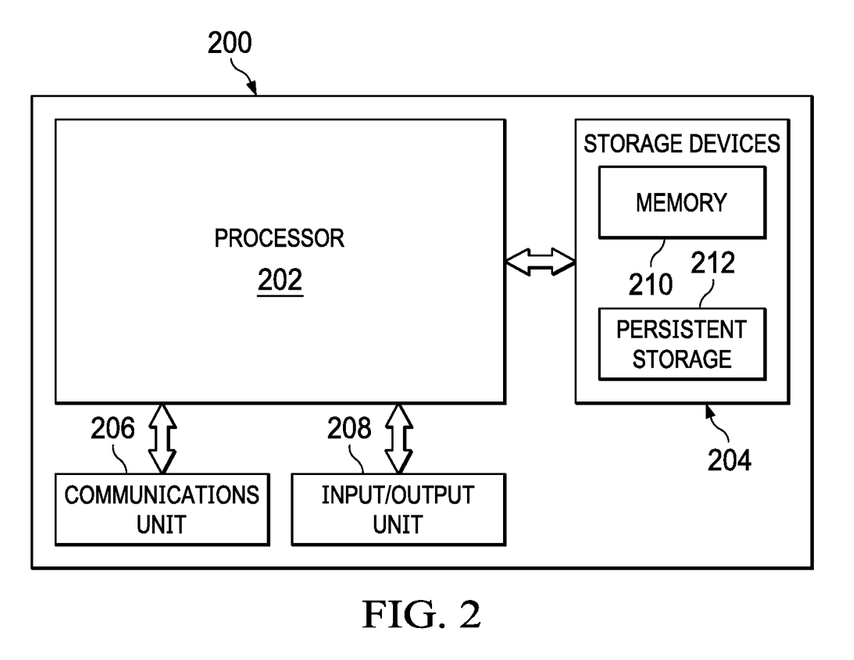
FIG. 2 illustrates an example device for accurate automatic determination of "alarm-operated action" linkage for operator assessment and alarm guidance using custom graphics and control charts according to this disclosure.

FIG. 2 illustrates an example device for accurate automatic determination of "alarm-operator action" linkage for operator assessment and alarm guidance using custom graphics and control charts according to this disclosure. In particular, FIG. 2 illustrates an example computing device 200. In some embodiments, the computing device 200 could denote an operator station, server, a remote server or device, or a mobile device. The computing device 200 could be used to run applications. For ease of explanation, the computing device 200 is described as being used in the system 100 of FIG. 1, although the device could be used in any other suitable system (whether or not related to industrial process control and automation).

As shown in FIG. 2, the computing device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) configured to store and facilitate retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read-only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Figure 3:
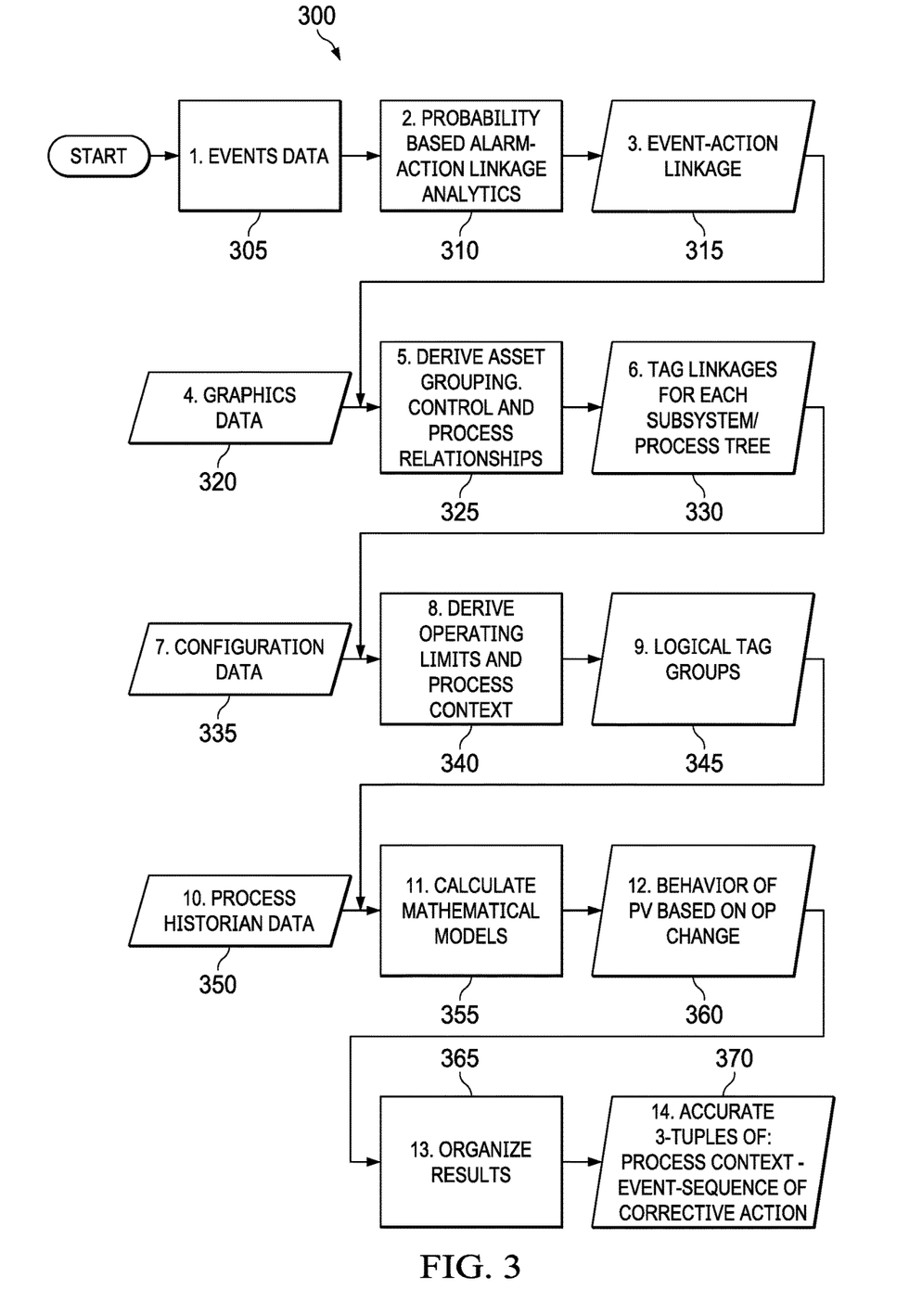
FIG. 3 illustrates a process for accurate automatic determination of "alarm-operated action" linkage for operator assessment and alarm guidance using custom graphics and control charts according to this disclosure.

FIG. 3 illustrates a method 300 for accurate automatic determination of "alarm-operated action" linkage for operator assessment and alarm guidance using custom graphics and control charts according to this disclosure. For example, the method 300 described in FIG. 3 may be performed in conjunction with the computing device 200 in FIG. 2. FIG. 4 illustrates example data sources 400 according to this disclosure. The embodiment of the data sources 400 illustrated in FIG. 4 is for illustration only. FIG. 4 does not limit the scope of this disclosure to any particular implementation.

In operation 305, the computing device 200 determines the events data 410 from the events data source 405. The events data 410 includes process alarms, alarm priority, process changes, process message, system alarms, time stamps, etc.

In operation 310, the computing device 200 calculates a first level event-action obtained using a predictability and significance. The information 415 extracted from the events data includes determining operators availability to respond, or operational constraints based on alarm priority, alarm grouping, and alarm-operator action linkage.

In operation 315, the computing device 200 performs event-action linkage. The data structure contains events and action sequences that are statistically likely to follow the event. One event may have multiple distinct sets of action sequences. The linkage is organized based on process context, i.e., shutdown/startup, grade change, abnormal condition, cyclically anticipated & planned activities. The use of the information extracted from the events data includes enabling context of event identification at a first level model and provides first level "alarm-operator response" linkage.

In operation 320, the computing device 200 determines the graphics data 425 from the graphics data source 420. The graphics data 420 includes a process tag, secondary process tag, upstream data and downstream data, process connection and control connection, device type, and graphic object type.

In operation 325, the computing device 200 derives asset group, control and process relationships. Graphics data is parsed to identify tags that are interdependent, independent and dependent in relation to other tags. A linkage type between tags is included—control linkage or process linkage. This linkage detail is added to the event—action linkage. Graphics data is used to validate the event—action linkage found using statistics. The manipulated variable-to-process variable relationship from the history data is also used in deriving the process relationship. Linkages that do not match are flagged for further investigation. The information 430 extracted from the graphics data includes interdependent, independent and dependent sequences of variables for each model representing a subsystem.

In operation 330, the computing device 200 tags linkages or process trees for each subsystem. This is a data structure containing events and action sequences based on linkage type. Linkages are organized based on subsystem and plant context to form process trees. The uses of the information extracted from the graphics data includes improving computational efficiency, providing process relationships, improving accuracy of control relationship, and improving the process context accuracy and enables "process context-alarm-operator action" linkage.

In operation 335, the computing device 200 determines the configuration data 440 from the configuration data source 435. The configuration data 440 includes a process tag, input connection, output connection, algorithm type, description, asset (grouping), parameter name, data type, parameter value, dynamic alarm suppression.

In operation 340, the computing device 200 derives operating limits and alarm grouping. The computing device 200 parses the configuration data 420 to group tags and action sequence by assets. Magnitude of the actions and values of the tags are validated with the operating limits specified in the configuration data. Control configuration is also used to derive the alarm grouping based on the dynamic alarm suppression configuration. The information 445 extracted from the configuration data includes control relationships, operating limits for model parameters, asset grouping, parameter types (numeric, enumeration, Boolean), and alarm grouping or process connection based on "dynamic alarm suppression."

In operation 345, the computing device 200 determines the logical tag groups. This is a data structure containing sets of logical tag groups. This data enables further event definition & analysis. The uses of the information extracted from the configuration data include improving the accuracy of the analytics model and enable identification of the process context.

In operation 350, the computing device 200 determines process historian data 455 from a process historian data source 450. The process historian data 455 includes configuration of sampling intervals and history process variables (PV)/operating parameters (OP) data.

In operation 355, the computing device 200 calculates the mathematical models. Logical tag groups and process historian data for those tags are used with methods of system identification to form mathematical models. The information 460 extracted from the process historian data includes critical loops; deviation from operating limits, cost impact due to deviation from operating loops.

In operation 360, the computing device 200 determines the behavior of PV based on OP change. This is a data structure containing sets of logical tag groups and changes in tag values resulting from sequences of actions. The use of the information extracted from the process historian data includes providing manipulated variables to process variables relationships.

In operation 365, the computing device 200 organizes the results. This is a data structure containing accurate 3-tuples of: process context—event—sequence of corrective action. Each tuple is a benchmark set of corrective actions to respond to an event in a specific process context.

In operation 370, the computing device 200 determines accurate 3-tuples of process context, event, sequence of corrective action. Accurate tuples enable the effective implementation of the following objectives (1) training simulator for process operations, (2) prescriptive and optimal guidance for corrective action sequences, (3) platform for autonomous operation.

Figure 5:
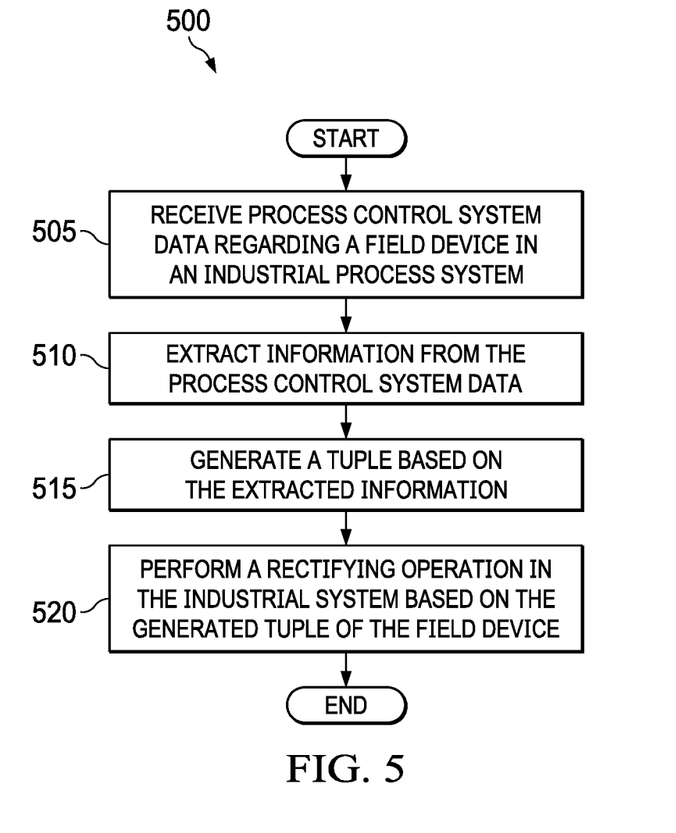
FIG. 5 illustrates an example method for accurate automatic determination of alarm-operator action linkage for operator assessment and alarm guidance using custom graphics and control charts according to this disclosure.

FIG. 5 illustrates an example method for accurate automatic determination of alarm-operator action linkage for operator assessment and alarm guidance using custom graphics and control charts according to this disclosure. For example, the method described in FIG. 5 may be performed in conjunction with the computing device 200 in FIG. 2.

In operation 505, the computing device 200 receives process control system data regarding a field device in an industrial process control and automation system. The process control system data can include events data, configuration data, graphic data, and process historian data.

In operation 510, the computing device 200 extracts information from the process control system data. For events data, the extracted information can includes process alarms, alarm priorities, process changes, process messages, system alarms, time stamps, etc. For configuration data, the extracted information can include input connections, output connections, algorithm types, descriptions, asset (grouping), parameter names, data types, parameter values, dynamic alarm suppression, etc. For graphic data, the extracted information can include secondary process tags, upstreams, downstreams, process connections, control connections, device types, graphic object types, etc. For process historian data, the extracted information can include configurations of sampling intervals, history of process variables, operating process data, etc.

In operation 515, the computing device 200 generates a tuple based on the extracted information. The tuple is generated to connect the process context, the event occurrence, and a sequence of corrective actions. The process context includes relationships between variables and effects on the automation system. The events are typical actions that occur based on the operating of the process controls. The sequence of corrective actions are the typical rectifying operations to correct the events that are disrupting the system.

In operation 520, the computing device 200 performs a rectifying operation in the industrial process control and automation system based on the generated tuple of the field device.

Although FIG. 5 illustrates one example of a method 500 for accurate automatic determination of alarm-operator action linkage for operator assessment and alarm guidance using custom graphics and control charts, various changes may be made to FIG. 5. For example, various steps shown in FIG. 5 could overlap, occur in parallel, occur in a different order, or occur any number of times.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a memory; and
a processor operably connected to the memory, the processor configured to:
receive process control system data regarding a field device in an industrial process control and automation system, wherein the process control system data includes configuration data, and wherein the configuration data includes an input connection, an output connection, an algorithm type, a description, an asset, a parameter name, a data type, a parameter value, and a dynamic alarm suppression;
extract information from the process control system data, wherein the extracting information from the process control system data includes determining a control relationship, an operating limit for model parameters, an asset group, a parameter type, and an alarm grouping or process connection;
generate a tuple based on the extracted information; and
perform a rectifying operation in the industrial process control and automation system based on the generated tuple of the field device.

2. The apparatus of claim 1, wherein the processor is further configured to:
determine a process context, an event, and a sequence of corrective action; and
generate the tuple for the process context, the event, and the sequence of corrective action.

3. The apparatus of claim 1, wherein:
the process control system data includes events data,
the events data includes a process alarm, an alarm priority, a process change, a process message, a system alarm, and a time stamp, and
wherein extracting information from the process control system data includes determining an operator ability to respond, an alarm grouping, and an alarm-operator action linkage.

4. The apparatus of claim 1, wherein:
the process control system data includes graphic information,
the graphic information includes a secondary tag, an upstream data and downstream data, a process connection or control connection, a device type, and a graphic object type, and
wherein extracting information from the process control system data includes determining interdependent, independent, and dependent sequences of variables for each model.

5. The apparatus of claim 1, wherein:
the process control system data includes process historian data,
the historian data includes a configuration of sampling interval and a history of PV/OP data, and
wherein extracting information from the process control system data includes determining a critical loop, a deviation from operating limits, and a cost impact due to deviation from operating loops.

6. The apparatus of claim 1, wherein the tuple includes a set of corrective actions to respond to an event in a specific process context.

7. A method comprising:
receiving process control system data regarding a field device in an industrial process control and automation system, wherein the process control system data includes configuration data comprising an input connection, an output connection, and an algorithm type;
extracting information from the process control system data, including determining a control relationship, an operating limit for model parameters, an asset group, a parameter type, and an alarm grouping or process connection;

generating a tuple based on the extracted information; and performing a rectifying operation in the industrial process control and automation system based on the generated tuple of the field device.

8. The method of claim 7, further comprising:

determining a process context, an event, and a sequence of corrective action; and generating the tuple for the process context, the event, and the sequence of corrective action.

9. The method of claim 7, wherein:

the process control system data includes events data, the events data comprises a process alarm, an alarm priority, a process change, a process message, a system alarm, and a time stamp, and wherein extracting information from the process control system data includes determining an operator ability to respond, an alarm grouping, and an alarm-operator action linkage.

10. The method of claim 7, wherein:

the configuration data further comprises one or more of a description, an asset, a parameter name, a data type, a parameter value, and a dynamic alarm suppression.

11. The method of claim 7, wherein:

the process control system data includes graphic information, the graphic information comprises a secondary tag, an upstream data and downstream data, a process connection or control connection, a device type, and a graphic object type, and wherein extracting information from the process control system data includes determining interdependent, independent, and dependent sequences of variables for each model.

12. The method of claim 7, wherein:

the process control system data includes process historian data, the historian data comprises a configuration of sampling interval and a history of PV/OP data, and wherein extracting information from the process control system data includes determining a critical loop, a deviation from operating limits, and a cost impact due to deviation from operating loops.

13. The method of claim 7, wherein the tuple includes a set of corrective actions to respond to an event in a specific process context.

14. A non-transitory machine-readable medium encoded with executable instructions that, when executed, cause one or more processors to:

receive process control system data regarding a field device in an industrial process control and automation system, the process control system data includes configuration data comprising an input connection, an output connection, and an algorithm type;

extract information from the process control system data, including determining a control relationship, an operating limit for model parameters, an asset group, a parameter type, and an alarm grouping or process connection;

generate a tuple based on the extracted information; and perform a rectifying operation in the industrial process control and automation system based on the generated tuple of the field device.

15. The non-transitory machine-readable medium of claim 14, wherein the instructions further cause the one or more processors to:

determine a process context, an event, and a sequence of corrective action; and generate the tuple for the process context, the event, and the sequence of corrective action.

16. The non-transitory machine-readable medium of claim 14, wherein:

the process control system data includes events data, the event data comprises a process alarm, an alarm priority, a process change, a process message, a system alarm, and a time stamp, and wherein extraction of information from the process control system data includes a determination of an operator ability to respond, an alarm grouping, and an alarm-operator action linkage.

17. The non-transitory machine-readable medium of claim 14, wherein the configuration data further comprises one or more of a description, an asset, a parameter name, a data type, a parameter value, and a dynamic alarm suppression.

18. The non-transitory machine-readable medium of claim 14, wherein:

the process control system data includes graphic information, the graphic information comprises a secondary tag, an upstream data and downstream data, a process connection or control connection, a device type, and a graphic object type, and wherein extraction of information from the process control system data includes a determination of an interdependent, independent, and dependent sequences of variables for each model.

19. The non-transitory machine-readable medium of claim 14, wherein:

the process control system data includes process historian data, the historian data comprises a configuration of sampling interval and a history of PV/OP data, and wherein extraction of information from the process control system data includes a determination of a critical loop, a deviation from operating limits, and a cost impact due to deviation from operating loops.

* * * * *